United States Patent
Lee et al.

(10) Patent No.: US 9,514,885 B2
(45) Date of Patent: Dec. 6, 2016

(54) COMPOSITE ELECTRONIC COMPONENT AND BOARD HAVING THE SAME MOUNTED THEREON

(71) Applicant: SAMSUNG ELECTRO-MECHANICS CO., LTD., Suwon, Gyunggi-do (KR)

(72) Inventors: Jea Hoon Lee, Gyunggi-do (KR); Young Ghyu Ahn, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 354 days.

(21) Appl. No.: 14/188,424

(22) Filed: Feb. 24, 2014

(65) Prior Publication Data
US 2015/0116966 A1    Apr. 30, 2015

(30) Foreign Application Priority Data
Oct. 31, 2013 (KR) .................. 10-2013-0130788

(51) Int. Cl.
| | |
|---|---|
| H01G 4/40 | (2006.01) |
| H05K 1/18 | (2006.01) |
| H01F 27/29 | (2006.01) |
| H01G 4/30 | (2006.01) |
| H01G 4/232 | (2006.01) |
| H01F 17/00 | (2006.01) |

(52) U.S. Cl.
CPC ............ *H01G 4/40* (2013.01); *H01F 17/0013* (2013.01); *H01F 27/292* (2013.01); *H01G 4/232* (2013.01); *H01G 4/30* (2013.01); *H01F 2017/0026* (2013.01)

(58) Field of Classification Search
CPC ............ H01G 4/40; H01G 4/30; H05K 1/181; H01F 27/29
See application file for complete search history.

(56) References Cited

U.S. PATENT DOCUMENTS

| | | | | |
|---|---|---|---|---|
| 4,777,461 | A * | 10/1988 | Sakamoto ............ | H03H 7/0115 333/184 |
| 5,402,321 | A * | 3/1995 | Izu ........................ | H01F 27/027 174/536 |
| 5,559,682 | A * | 9/1996 | Kanouda ........... | H02M 3/33538 363/21.06 |
| 5,602,517 | A † | 2/1997 | Kaneko | |

(Continued)

FOREIGN PATENT DOCUMENTS

| | | |
|---|---|---|
| JP | 06-325977 A | 11/1994 |
| KR | 2003-0014586 A | 2/2003 |
| KR | 10-2010-0049846 A | 5/2010 |

*Primary Examiner* — Jeremy C Norris
*Assistant Examiner* — Nathan Milakovich
(74) *Attorney, Agent, or Firm* — McDermott Will & Emery LLP

(57) ABSTRACT

There is provided a composite electronic component including a composite body having a capacitor and an inductor coupled to each other, the capacitor including a ceramic body in which a plurality of dielectric layers and first and second internal electrodes facing each other with the dielectric layers interposed therebetween are stacked, and the inductor including a magnetic body including a coil part; a first input terminal; an output terminal; and a ground terminal.

25 Claims, 8 Drawing Sheets

(56) References Cited

U.S. PATENT DOCUMENTS

| | | | | |
|---|---|---|---|---|
| 5,610,565 A * | 3/1997 | Maeda | | H03H 1/0007 |
| | | | | 333/181 |
| 6,727,782 B2 † | 4/2004 | Sasaki | | |
| 7,799,718 B2 * | 9/2010 | Kakuda | | C04B 35/465 |
| | | | | 361/321.4 |
| 8,544,754 B2 * | 10/2013 | Kato | | G06K 19/07749 |
| | | | | 235/492 |
| 9,390,862 B2 * | 7/2016 | Moon | | H01G 4/40 |
| 2003/0030510 A1 | 2/2003 | Sasaki et al. | | |
| 2007/0002513 A1 * | 1/2007 | Matsuoka | | H03H 7/38 |
| | | | | 361/118 |
| 2007/0025043 A1 * | 2/2007 | Terada | | H01G 4/30 |
| | | | | 361/118 |
| 2007/0096864 A1 * | 5/2007 | Fujimoto | | H01C 1/16 |
| | | | | 338/309 |
| 2011/0090665 A1 † | 4/2011 | Korony et al. | | |
| 2011/0309895 A1 * | 12/2011 | Ahn | | H03H 7/01 |
| | | | | 333/185 |
| 2012/0263940 A1 * | 10/2012 | Arzberger | | C09K 5/14 |
| | | | | 428/328 |
| 2013/0062994 A1 * | 3/2013 | Ogawa | | H01F 17/0013 |
| | | | | 310/311 |
| 2013/0155574 A1 * | 6/2013 | Park | | H01G 4/012 |
| | | | | 361/321.3 |
| 2014/0022042 A1 * | 1/2014 | Park | | H01F 17/0013 |
| | | | | 336/200 |
| 2014/0312990 A1 * | 10/2014 | Lee | | H03H 7/0115 |
| | | | | 333/181 |
| 2014/0313785 A1 * | 10/2014 | Lee | | H02M 3/33507 |
| | | | | 363/21.01 |
| 2015/0022937 A1 * | 1/2015 | Park | | H01G 4/30 |
| | | | | 361/270 |
| 2015/0035621 A1 * | 2/2015 | Ahn | | H02M 1/126 |
| | | | | 333/184 |
| 2015/0041202 A1 * | 2/2015 | Ahn | | H01G 17/00 |
| | | | | 174/260 |
| 2015/0042414 A1 * | 2/2015 | Ahn | | H01G 4/40 |
| | | | | 333/184 |
| 2015/0043185 A1 * | 2/2015 | Ahn | | H05K 1/111 |
| | | | | 361/767 |
| 2015/0109074 A1 * | 4/2015 | Son | | H03H 7/0115 |
| | | | | 333/185 |
| 2015/0116891 A1 * | 4/2015 | Park | | H01G 4/40 |
| | | | | 361/270 |
| 2015/0131199 A1 * | 5/2015 | Park | | H01G 4/30 |
| | | | | 361/301.4 |
| 2016/0020041 A1 * | 1/2016 | Ahn | | H01G 15/00 |
| | | | | 363/21.01 |

\* cited by examiner
† cited by third party

COMPOSITE ELECTRONIC COMPONENT AND BOARD HAVING THE SAME MOUNTED THEREON

CROSS-REFERENCE TO RELATED APPLICATION

This application claims the benefit of Korean Patent Application No. 10-2013-0130788 filed on Oct. 31, 2013, with the Korean Intellectual Property Office, the disclosure of which is incorporated herein by reference.

BACKGROUND

The present disclosure relates to a composite electronic component including a plurality of passive devices and a board having the same mounted thereon.

In accordance with the recent demand for thinness and lightness of electronic apparatuses and improvements in performance of the electronic apparatuses, demands have been made for the electronic apparatuses to have various functions while having a significantly decreased size.

The electronic apparatuses may include a power semiconductor based power management integrated circuit (PMIC) serving to efficiently control and manage a limited battery resource in order to satisfy various service requirements.

However, as the electronic apparatuses have various functions, the number of direct current (DC) to DC converters included in the PMIC has increased. In addition, the number of passive devices required in a power input terminal and a power output terminal of the PMIC has also increased.

In this case, an area of the electronic apparatus in which components are disposed may be unavoidably increased, such that miniaturization of the electronic apparatus may be restricted.

In addition, large noise may occur due to the PMIC and wiring patterns of peripheral circuits of the PMIC.

RELATED ART DOCUMENT (Patent Document 1) Korean Patent Laid-Open Publication No. 2003-0014586

SUMMARY

An aspect of the present disclosure may provide a composite electronic component requiring a reduced mounting area in a driving power supplying system, and a board having the same mounted thereon.

An aspect of the present disclosure may also provide a composite electronic component capable of suppressing the occurrence of noise in a driving power supplying system, and a board having the same mounted thereon.

According to an aspect of the present disclosure, a composite electronic component may include: a composite body having a capacitor and an inductor coupled to each other, the capacitor including a ceramic body in which a plurality of dielectric layers and first and second internal electrodes facing each other with the dielectric layers interposed therebetween are stacked, and the inductor including a magnetic body including a coil part; a first input terminal formed on a first end surface of the composite body and connected to the coil part of the inductor and a second input terminal formed on at least one of upper and lower surfaces and a second side surface of the capacitor and connected to the second internal electrode of the capacitor; an output terminal formed on a second end surface of the composite body and connected to the coil part of the inductor; and a ground terminal formed on at least one of the upper and lower surfaces and a first side surface of the capacitor and connected to the first internal electrode of the capacitor.

The magnetic body may have a form in which a plurality of magnetic layers having conductive patterns formed thereon are stacked therein, the conductive patterns configuring the coil part.

The inductor may have a thin film form in which the magnetic body includes an insulating substrate and a coil formed on at least one surface of the insulating substrate.

The magnetic body may include a core and a winding coil wound around the core.

The inductor may be a power inductor.

The first internal electrode may have a lead portion exposed to a first side surface of the composite body, and the second internal electrode may have a lead portion exposed to a second side surface of the composite body.

The inductor may be disposed on the capacitor.

The capacitor and the inductor may be connected to each other by a conductive adhesive.

According to another aspect of the present disclosure, a composite electronic component may include: a composite body having a capacitor and an inductor coupled to each other, the capacitor including a ceramic body in which a plurality of dielectric layers and first and second internal electrodes facing each other with the dielectric layers interposed therebetween and having lead portions exposed to first and second side surfaces of the ceramic body, respectively, are stacked, and the inductor including a magnetic body including a coil part; a first external electrode formed on the first side surface of the ceramic body and electrically connected to the first internal electrode, a second external electrode formed on the second side surface of the ceramic body and electrically connected to the second internal electrode, and first and second dummy electrodes formed on first and second end surfaces of the ceramic body, respectively; and third and fourth external electrodes formed on first and second end surfaces of the magnetic body, respectively, and connected to the coil part, wherein the composite body includes a first input terminal formed by coupling the first dummy electrode and the third external electrode to each other, a second input terminal formed as the second external electrode, an output terminal formed by coupling the second dummy electrode and the fourth external electrode to each other, and a ground terminal formed as the first external electrode.

The magnetic body may have a form in which a plurality of magnetic layers having conductive patterns formed thereon are stacked, the conductive patterns configuring the coil part.

The inductor may have a thin film form in which the magnetic body includes an insulating substrate and a coil formed on at least one surface of the insulating substrate.

The magnetic body may include a core and a winding coil wound around the core.

The inductor may be a power inductor.

The inductor may be disposed on the capacitor.

The capacitor and the inductor may be connected to each other by a conductive adhesive.

According to another aspect of the present disclosure, a composite electronic component may include: a first input terminal receiving power converted by a power managing unit; a second input terminal receiving power supplied from a battery; a power stabilizing unit stabilizing the power converted by the power managing unit and the power supplied from the battery and including a composite body having a capacitor and an inductor coupled to each other, the capacitor including a ceramic body in which a plurality of dielectric layers and first and second internal electrodes facing each other with the dielectric layers interposed therebetween are stacked, and the inductor including a magnetic body including a coil part; an output terminal supplying the power converted by the power managing unit and stabilized by the power stabilizing unit; and a ground terminal for grounding.

The first input terminal may be formed on a first end surface of the composite body, the second input terminal may be formed on a lower surface and a second side surface of the composite body and be connected to the second internal electrode of the capacitor, the output terminal may be formed on a second end surface of the composite body, and the ground terminal may be formed on the lower surface and a first side surface of the composite body and be connected to the first internal electrode of the capacitor.

The first internal electrode may have a lead portion exposed to a first side surface of the composite body, and the second internal electrode may have a lead portion exposed to a second side surface of the composite body.

The first input terminal may be formed by coupling a first dummy electrode formed on a first end surface of the ceramic body to a third external electrode formed on a first end surface of the magnetic body and connected to the coil part, the second input terminal may be formed as a second external electrode formed on a second side surface of the ceramic body and electrically connected to the second internal electrode, the output terminal may be formed by coupling a second dummy electrode formed on a second end surface of the ceramic body to a fourth external electrode formed on a second end surface of the magnetic body and connected to the coil part, and the ground terminal is formed as a first external electrode formed on a first side surface of the ceramic body and electrically connected to the first internal electrode.

According to another aspect of the present disclosure, a board having a composite electronic component mounted thereon may include: a printed circuit board having three or more electrode pads disposed thereon; the composite electronic component of any one of claims 1, 9, and 16 installed on the printed circuit board; and soldering parts connecting the electrode pads and the composite electronic component to each other.

The electrode pads may include a first electrode pad connected to the first input terminal of the composite electronic component, a second electrode pad connected to the output terminal of the composite electronic component, a third electrode pad connected to the ground terminal of the composite electronic component, and a fourth electrode pad connected to the second input terminal of the composite electronic component.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
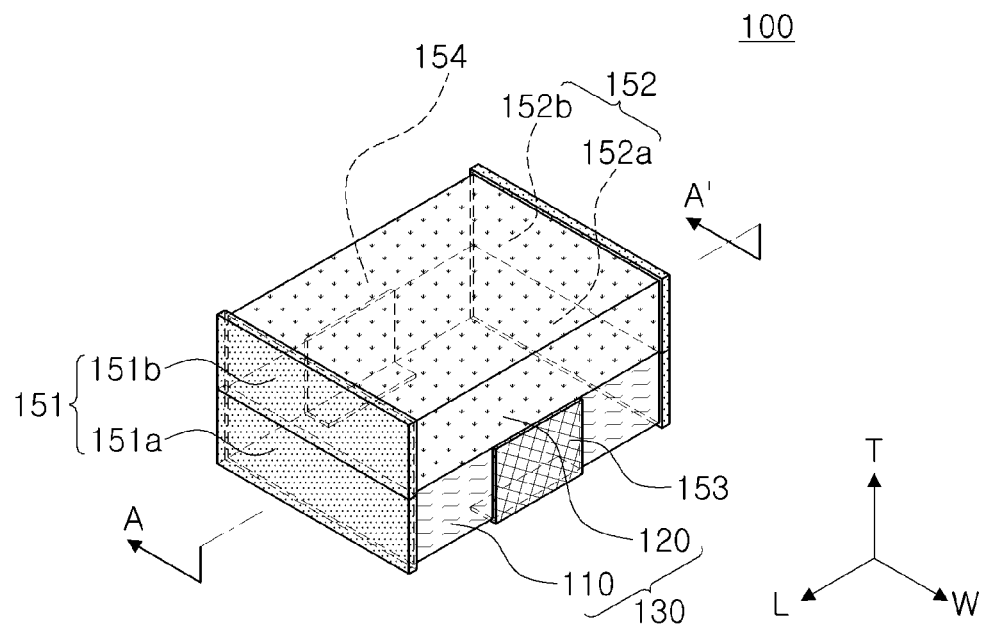
FIG. 1 is a perspective view schematically showing a composite electronic component according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Composite Electronic Component

Hereinafter, exemplary embodiments of the present disclosure will be described in detail with reference to the accompanying drawings.

FIG. 1 is a perspective view schematically showing a composite electronic component according to an exemplary embodiment of the present disclosure.

Figure 2:
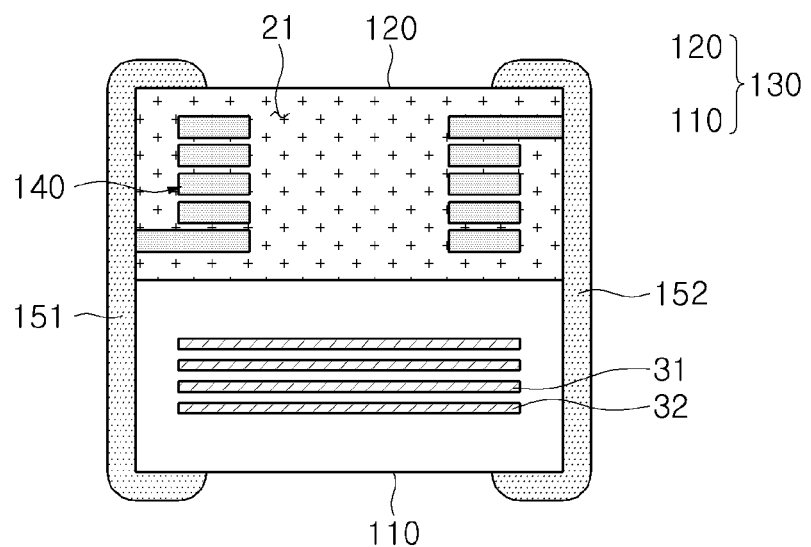
FIG. 2 is a cross-sectional view showing a first exemplary embodiment of the composite electronic component shown in FIG. 1, taken along line A-A'.

FIG. 2 is a cross-sectional view showing a first exemplary embodiment of the composite electronic component shown in FIG. 1, taken along line A-A'.

Figure 3:
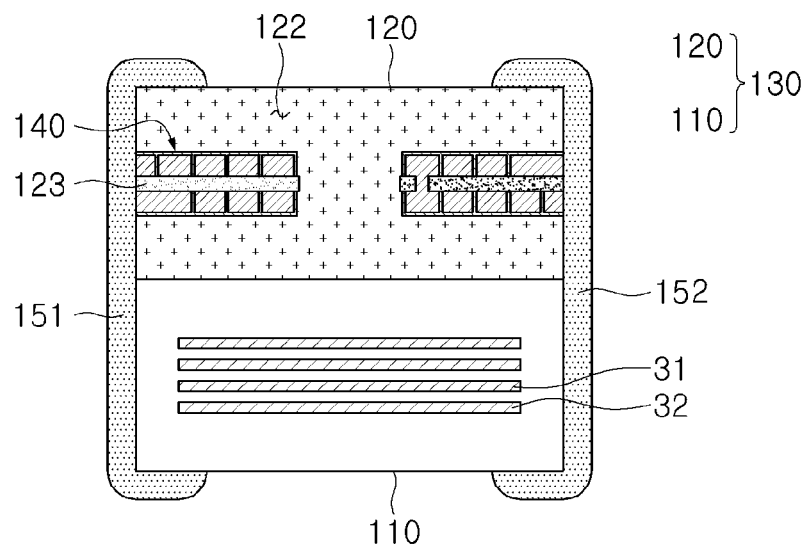
FIG. 3 is a cross-sectional view showing a second exemplary embodiment of the composite electronic component shown in FIG. 1, taken along line A-A'.

FIG. 3 is a cross-sectional view showing a second exemplary embodiment of the composite electronic component shown in FIG. 1, taken along line A-A'.

Figure 4:
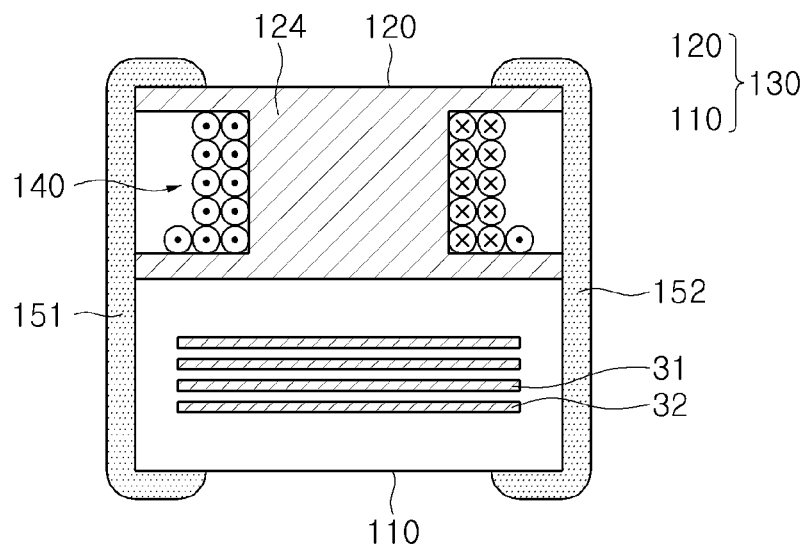
FIG. 4 is a cross-sectional view showing a third exemplary embodiment of the composite electronic component shown in FIG. 1, taken along line A-A'.

FIG. 4 is a cross-sectional view showing a third exemplary embodiment of the composite electronic component shown in FIG. 1, taken along line A-A'.

Figure 5:
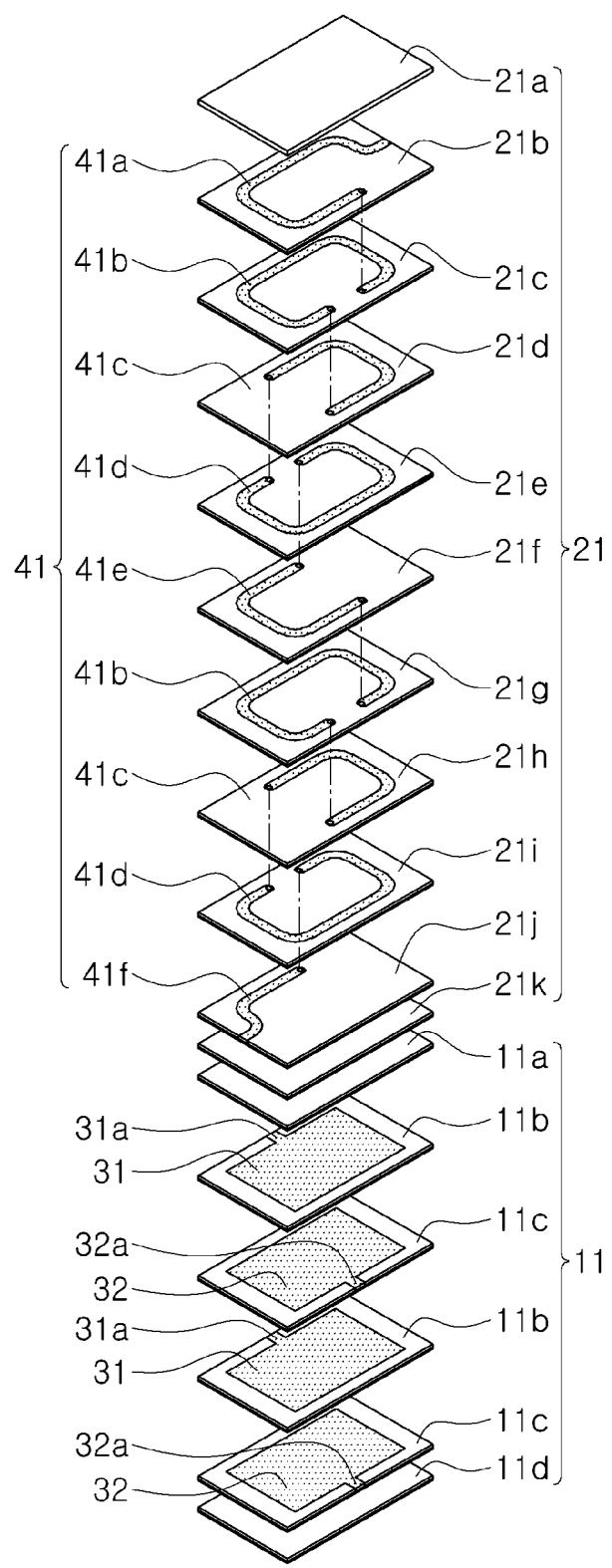
FIG. 5 is a schematic exploded perspective view showing a stacked state of the composite electronic component shown in FIG. 1 according to the first exemplary embodiment.

FIG. 5 is a schematic exploded perspective view showing a stacked state of the composite electronic component shown in FIG. 1 according to the first exemplary embodiment.

Figure 6:
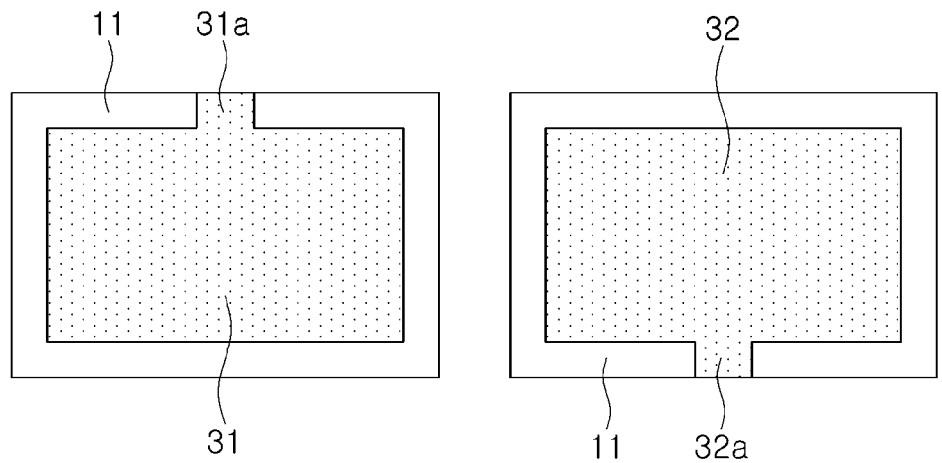
FIG. 6 is a plan view showing internal electrodes that may be used in a multilayer ceramic capacitor, an example of the composite electronic component shown in FIG. 1.

FIG. 6 is a plan view showing internal electrodes that may be used in a multilayer ceramic capacitor, an example of the composite electronic component shown in FIG. 1.

In the composite electronic component according to the exemplary embodiment of the present disclosure, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' may be used to have the same concept as that of a direction in which dielectric layers of a capacitor are stacked, that is, a 'stacking direction'.

Meanwhile, the length direction, the width direction, and the thickness direction of the composite electronic component may be defined as being the same as those of a capacitor and an inductor to be described below.

In addition, in an exemplary embodiment of the present disclosure, the composite electronic component may have upper and lower surfaces opposing each other, and first and second side surfaces and first and second end surfaces connecting the upper and lower surfaces to each other. A shape of the composite electronic component is not particularly limited, but may be a hexahedral shape as shown.

Further, the first and second side surfaces and the first and second end surfaces of the composite electronic component may be defined as being the same as those of a capacitor and an inductor to be described below.

Meanwhile, the composite electronic component may have a form in which the capacitor and the inductor are coupled to each other. In the case in which the inductor is coupled to the capacitor, an upper surface of the composite electronic component refers to an upper surface of the inductor and a lower surface thereof refers to a lower surface of the capacitor.

In addition, the first and second side surfaces refer to surfaces of the composite electronic component opposing each other in the width direction, the first and second end surfaces refer to surfaces of the composite electronic component opposing each other in the length direction, and the upper and lower surfaces refer to surfaces of the composite electronic component opposing each other in the thickness direction.

Referring to FIGS. 1 through 6, a composite electronic component 100 according to an exemplary embodiment of the present disclosure may include a composite body 130 having a capacitor 110 and an inductor 120 coupled to each other, the capacitor 110 including a ceramic body in which a plurality of dielectric layers 11 and internal electrodes 31 and 32 facing each other with the dielectric layers 11 interposed therebetween are stacked, and the inductor 120 including a magnetic body including a coil part 140.

In the exemplary embodiment of the present disclosure, the composite body 130 may have upper and lower surfaces opposing each other, and first and second side surfaces and first and second end surfaces connecting the upper and lower surfaces to each other.

A shape of the composite body 130 is not particularly limited, but may be a hexahedral shape as shown in the exemplary embodiment.

The composite body 130 having the hexahedral shape may be formed by coupling the capacitor 110 and the inductor 120 to each other. However, a method of forming the composite body 130 is not particularly limited.

For example, the composite body 130 may be formed by coupling the capacitor 110 and the inductor 120 that are separately formed to each other by a conductor adhesive, a resin, or the like, or may be formed by sequentially stacking the ceramic body configuring the capacitor 110 and the magnetic body configuring the inductor 120. However, the method of forming the composite body 130 is not limited thereto.

Meanwhile, according to an exemplary embodiment of the present disclosure, the inductor 120 may be disposed on the capacitor 110, but is not limited thereto. That is, the inductor 120 may be disposed in various forms.

Hereinafter, the capacitor 110 and the inductor 120 configuring the composite body 130 will be described in detail.

According to an exemplary embodiment of the present disclosure, the magnetic body configuring the inductor 120 may include the coil part 140.

The inductor 120 is not particularly limited, but may be, for example, a multilayer type inductor, a thin film type inductor, or a winding type inductor. In addition to the above-mentioned inductors, a laser helixing type inductor may also be used as the inductor 120.

The multilayer type inductor may be manufactured by thickly printing electrodes on thin ferrite or glass ceramic sheets, stacking several sheets on which coil patterns are printed, and connecting internal conducting wires to each other through via-holes.

The thin film type inductor may be manufactured by forming conductive coil wires on a ceramic substrate by a thin film sputtering or a plating method and then performing a filling of a ferrite material.

The winding type inductor may be manufactured by winding wires (conductive coil wires) around a core.

The laser helixing type inductor may be manufactured by forming an electrode layer on a ceramic bobbin through a sputtering or plating method, forming a coil shape by laser helixing, covering the coil shape with an external protection film resin, and then forming an external terminal.

Referring to FIG. 2, in the composite electronic component according to the first exemplary embodiment of the present disclosure, the inductor 120 may be the multilayer type inductor.

By way of example, the magnetic body may have a form in which a plurality of magnetic layers 21 having conductive patterns 41 formed thereon are stacked, wherein the conductive patterns 41 may configure the coil part 140.

Referring to FIG. 3, in the composite electronic component according to the second exemplary embodiment of the present disclosure, the inductor 120 may be the thin film type inductor.

By way of example, the inductor 120 may have a thin film form in which the magnetic body includes an insulating substrate 123 and a coil formed on at least one surface of the insulating substrate 123.

The magnetic body may be formed by filling upper and lower portions of the insulating substrate 123 having the coil formed on at least one surface thereof with a magnetic material 122.

Referring to FIG. 4, in the composite electronic component according to the third exemplary embodiment of the present disclosure, the inductor 120 may be the winding type inductor.

By way of example, the inductor 120 may have a form in which the magnetic body includes a core 124 and a winding coil wound around the core 124.

The magnetic layers 21 and the magnetic material 122 may be formed of a Ni—Cu—Zn based material, a Ni—

Cu—Zn—Mg based material, or a Mn—Zn ferrite based material, but is not limited thereto.

According to an exemplary embodiment of the present disclosure, the inductor 120 may be a power inductor that may be applied to a large amount of current.

The power inductor may be a high efficiency inductor having an inductance change lower than that of a general inductor when direct current (DC) is applied thereto. That is, it may be considered that the power inductor includes DC bias characteristics (inductance change at the time of applying the DC current thereto) as well as functions of a general inductor.

That is, the composite electronic component according to the exemplary embodiment of the present disclosure may be used in a power management integrated circuit (PMIC) and may include the power inductor, a high efficiency inductor having an inductance change lower than that of a general inductor when the DC current is applied thereto.

Hereinafter, in the composite electronic component, the case in which the inductor 120 is the multilayer type inductor according to the first exemplary embodiment of the present disclosure, among the first to third exemplary embodiments of the present disclosure, will be described in more detail.

The magnetic body may be manufactured by printing the conductive patterns 41 on a plurality of respective magnetic green sheets 21b to 21j, stacking the plurality of magnetic green sheets 21b to 21j having the conductive patterns 41 formed thereon, stacking magnetic green sheets 21a and 21k on an upper portion of the magnetic green sheet 21b and a lower portion of the magnetic green sheet 21j, respectively, and then sintering the magnetic green sheets 21a to 21k.

The magnetic material may be a Ni—Cu—Zn based material, a Ni—Cu—Zn—Mg based material, or a Mn—Zn ferrite based material, but is not limited thereto.

Referring to FIG. 5, the magnetic body may be formed by printing the conductive patterns 41 on the magnetic green sheets 21b to 21j, drying the conductive patterns 41, and then stacking the magnetic green sheets 21a and 21k on the upper portion of the magnetic green sheet 21b and the lower portion of the magnetic green sheet 21j, respectively.

The conductive patterns 41 of the magnetic body may include a plurality of conductive patterns 41a to 41f stacked to form a coil pattern in a stacking direction.

The conductive patterns 41 may be formed by printing a conductive paste containing silver (Ag) as a main component at a predetermined thickness.

The conductive patterns 41 may be electrically connected to third and fourth external electrodes 151b and 152b formed on both end portions of the composite electronic component in the length direction thereof, respectively, and configuring input and output terminals 151 and 152, respectively.

The conductive patterns 41 may include lead portions electrically connected to the third and fourth external electrodes 151b and 152b configuring the input and output terminals 151 and 152, respectively.

One conductive pattern 41a and another conductive pattern 41b of the conductive patterns 41 disposed with the magnetic green sheet 21b of the magnetic layers 21 interposed therebetween may be electrically connected to each other by a via electrode formed on the magnetic green sheet 21b and may form the coil pattern in the stacking direction.

In an exemplary embodiment of the present disclosure, the coil pattern is not particularly limited, but may be designed in accordance with inductance of the inductor.

That is, second to fifth conductive patterns 41b to 41e may be stacked in a coil form between a first conductive pattern 41a having a lead portion exposed to the second end surface of the composite body and a sixth conductive pattern 41f having a lead portion exposed to the first end surface of the composite body, and the respective conductive patterns may be connected to each other by via electrodes formed in the respective magnetic green sheets, as described above.

Although FIG. 5 illustrates the case in which the sequence of the second to fifth conductive patterns 41b and 41e is repeated two times, the present disclosure is not limited thereto. That is, the number of repeated times is not limited and may be changed depending on an object of the present disclosure.

Meanwhile, the ceramic body configuring the capacitor 110 may be formed by stacking a plurality of dielectric layers 11a to 11d, and a plurality of internal electrodes 31 and 32 (first and second internal electrodes) may be disposed in the ceramic body to be spaced apart from each other with the dielectric layers interposed therebetween.

The dielectric layers 11 may be formed by sintering ceramic green sheets containing a ceramic powder, an organic solvent, and an organic binder. The ceramic powder, a high k material, may be a barium titanate ($BaTiO_3$) based material, a strontium titanate ($SrTiO_3$) based material, or the like, but is not limited thereto.

Meanwhile, according to an exemplary embodiment of the present disclosure, the internal electrodes may include the first internal electrode 31 having a lead portion 31a exposed to the first side surface of the composite body 130 and the second internal electrode 32 having a lead portion 32a exposed to the second side surface of the composite body 130, but are not limited thereto.

By way of example, the ceramic body configuring the capacitor 110 may be formed by stacking the plurality of dielectric layers 11a to 11d.

The first and second internal electrodes 31 and 32 may be formed and stacked on some dielectric layers 11b and 11c among the plurality of dielectric layers 11a to 11d, respectively.

According to an exemplary embodiment of the present disclosure, the first and second internal electrodes 31 and 32 may be formed using a conductive paste containing a conductive metal.

The conductive metal may be nickel (Ni), copper (Cu), palladium (Pd), or an alloy thereof, but is not limited thereto.

The first and second internal electrodes 31 and 32 may be printed on the ceramic green sheets forming the dielectric layers 11, using a conductive paste by a printing method such as a screen printing method or a gravure printing method.

The ceramic green sheets having the internal electrodes printed thereon may be alternately stacked and sintered to form the ceramic body.

Although FIG. 6 illustrates pattern shapes of the first and second internal electrodes 31 and 32, the pattern shapes are not limited to the examples illustrated in FIG. 6, but may be variously changed.

The capacitor may serve to control voltage supplied from the PMIC.

The composite electronic component 100 according to an exemplary embodiment of the present disclosure may include a first input terminal 151 formed on the first end surface of the composite body 130 and connected to the coil part 140 of the inductor 120; a second input terminal 154 formed on at least one of upper and lower surfaces and the second side surface of the capacitor 110 and connected to the second internal electrode 32; an output terminal 152 formed on the second end surface of the composite body 130 and connected to the coil part 140 of the inductor 120; and a ground terminal 153 formed on at least one of the upper and lower surfaces and the first side surface of the capacitor 110 and connected to the first internal electrode 31 of the capacitor 110.

The first input terminal 151 and the output terminal 152 may be connected to the coil part of the inductor 120 to thereby serve as an inductor in the composite electronic component.

In addition, the second input terminal 154 and the ground terminal 153 may be connected to the second electrode 32 and the first internal electrode 31 of the capacitor 110, respectively, to thereby serve as a capacitor in the composite electronic component.

The first input terminal 151, the second input terminal 154, the output terminal 152, and the ground terminal 153 may be formed using a conductive paste containing a conductive metal.

The conductive metal may be nickel (Ni), copper (Cu), tin (Sn), or an alloy thereof, but is not limited thereto.

The conductive paste may further contain an insulating material. The insulating material may be, for example, glass, but is not limited thereto.

A method of forming the first input terminal 151, the second input terminal 154, the output terminal 152, and the ground terminal 153 is not particularly limited. That is, the first input terminal 151, the second input terminal 154, the output terminal 152, and the ground terminal 153 may be formed by dipping the ceramic body or be formed by another method such as a plating method, or the like.

Figure 7:
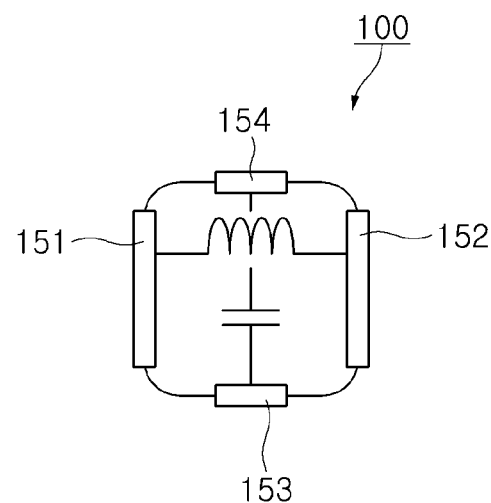
FIG. 7 is an equivalent circuit diagram of the composite electronic component shown in FIG. 1.

FIG. 7 is an equivalent circuit diagram of the composite electronic component shown in FIG. 1.

Referring to FIG. 7, the composite electronic component according to an exemplary embodiment of the present disclosure may include the inductor 120 and the capacitor 110 coupled to each other, unlike in the case of the related art. Therefore, the inductor 120 and the capacitor 110 may be designed to have the shortest distance therebetween, to thereby allow for a reduction in noise.

In addition, the inductor 120 and the capacitor 110 may be coupled to each other, such that an area in which they are mounted in the PMIC is significantly decreased, whereby the securing of a mounting space may be facilitated.

In addition, a cost required for mounting the inductor 120 and the capacitor 110 may be decreased.

Meanwhile, the composite electronic component 100 according to another exemplary embodiment of the present disclosure may include the composite body 130 having the capacitor 110 and the inductor 120 coupled to each other, the capacitor 110 including a ceramic body in which the plurality of dielectric layers 11 and the first and second internal electrodes 31 and 32 facing each other with the dielectric layers 11 interposed therebetween and having the lead portions 31a and 32b exposed to first and second side surfaces of the ceramic body, respectively, are stacked, the inductor 120 including a magnetic body including the coil part 140; the first external electrode 153 formed on the first side surface of the ceramic body and electrically connected to the first internal electrode 31, the second external electrode 154 formed on the second side surface of the ceramic body and electrically connected to the second internal electrode 32, and first and second dummy electrodes 151a and 152a formed on the first and second end surfaces of the ceramic body, respectively; and the third and fourth external electrodes 151b and 152b formed on the first and second end surfaces of the magnetic body, respectively, and connected to the coil part 140, wherein the composite body 130 may include the first input terminal 151 formed by coupling the first dummy electrode 151a and the third external electrode 151b to each other, the second input terminal 154 formed as the second external electrode 154, the output terminal 152 formed by coupling the second dummy electrode 152a and the fourth external electrode 152b to each other, and the ground terminal 153 formed as the first external electrode.

The capacitor 110 may include the first external electrode 153 formed on the first side surface of the ceramic body and electrically connected to the first internal electrode 31, the second external electrode 154 formed on the second side surface of the ceramic body and electrically connected to the second internal electrode 32, and the first and second dummy electrodes 151a and 152a formed on the first and second end surfaces of the ceramic body, respectively.

The first external electrode 153 may be formed on the first side surface of the ceramic body, but may also be extended to the upper and lower surfaces of the ceramic body.

The second external electrode 154 may be formed on the second side surface of the ceramic body, but may also be extended to the upper and lower surfaces of the ceramic body.

The first and second dummy electrodes 151a and 152a may be formed on the respective first and second end surfaces of the ceramic body but may also be extended to the upper and lower surfaces and the first and second side surfaces of the ceramic body.

That is, the capacitor 110 included in the composite electronic component according to another exemplary embodiment of the present disclosure may include the first external electrode 153, the second external electrode 154, and the first and second dummy electrodes 151a and 152a, and thus, be a four-terminal capacitor.

In addition, the inductor 120 may include the third and fourth external electrodes 151b and 152b formed on the first and second end surfaces of the magnetic body, respectively, and connected to the coil part 140.

The third and fourth external electrodes 151b and 152b may be formed on the first and second end surfaces of the magnetic body, respectively, but may also be extended to the upper and lower surfaces and first and second side surfaces of the magnetic body.

The first dummy electrode 151a of the capacitor 110 and the third external electrode 151b of the inductor 120 may be coupled to each other to form the first input terminal 151 of the composite electronic component.

The first input terminal 151 may receive power converted by a power managing unit in order to stabilize the power converted by the power managing unit in the composite electronic component to be described below.

As the second external electrode 154 of the capacitor 110, the second input terminal 154 of the composite electronic component may be formed.

The second input terminal 154 may receive power supplied from a battery in order to stabilize the power supplied from the battery in the composite electronic component, to be described below.

The second dummy electrode 152a of the capacitor 110 and the fourth external electrode 152b of the inductor 120 may be coupled to each other to form the output terminal 152 of the composite electronic component.

Meanwhile, the first external electrode 153 of the capacitor 110, a ground electrode, may be connected to an electrode pad on a substrate to form the ground terminal 153 of the composite electronic component.

The first dummy electrode 151a of the capacitor 110 and the third external electrode 151b of the inductor 120 that form the first input terminal 151 may be coupled to each other by a conductive adhesive, but are not necessarily limited thereto.

The second dummy electrode 152a of the capacitor 110 and the fourth external electrode 152b of the inductor 120 forming the output terminal 152 may be coupled to each other by a conductive adhesive, but are not necessarily limited thereto.

The conductive adhesive is not particularly limited, but may be, for example, a conductive epoxy paste.

The first input terminal 151, the second input terminal 154, the output terminal 152, and the ground terminal 153 may have a plating layer (not shown) formed thereon, respectively.

In the case in which the plating layer is formed after the capacitor 110 is adhered to the inductor 120 by the conductive adhesive, the plating layer may be formed only on the terminals exposed to the outside and may not be formed on the first and second external electrodes 153 and 154 formed on the upper surface of the capacitor 110.

However, the present disclosure is not limited to the method described above. For example, terminals may be respectively formed on external portions of the inductor 120 and the capacitor 110, and the plating layer may be formed and then adhered to the terminals, by a conductive adhesive.

In order to avoid an overlapped description, a detailed description regarding features of the composite electronic component 100 according to another exemplary embodiment of the present disclosure that are the same as those of the composite electronic component according to the exemplary embodiment of the present disclosure described above will be omitted.

A composite electronic component according to another exemplary embodiment of the present disclosure may include a first input terminal receiving power converted by a power managing unit; a second input terminal receiving power supplied from a battery; a power stabilizing unit stabilizing the power converted by the power managing unit and the power supplied from the battery and including a composite body having a capacitor and an inductor coupled to each other, the capacitor including a ceramic body in which a plurality of dielectric layers and first and second internal electrodes facing each other with the dielectric layers interposed therebetween are stacked, and the inductor including a magnetic body including a coil part; an output terminal supplying the power converted by the power managing unit and stabilized by the power stabilizing unit; and a ground terminal for grounding.

The first input terminal may be formed on the first end surface of the composite body, the second input terminal may be formed on the lower surface and the second side surface of the composite body and be connected to the second internal electrode of the capacitor, the output terminal may be formed on the second end surface of the composite body, and the ground terminal may be formed on the lower surface and the first side surface of the composite body and be connected to the first internal electrode of the capacitor.

The first internal electrode may have a lead portion exposed to the first side surface of the composite body, and the second internal electrode may have a lead portion exposed to the second side surface of the composite body.

The first input terminal may be formed by coupling the first dummy electrode formed on the first end surface of the ceramic body to the third external electrode formed on the first end surface of the magnetic body and connected to the coil part, the second input terminal may be formed as the second external electrode formed on the second side surface of the ceramic body and electrically connected to the second internal electrode, the output terminal may be formed by coupling the second dummy electrode formed on the second end surface of the ceramic body to the fourth external electrode formed on the second end surface of the magnetic body and connected to the coil part, and the ground terminal may be formed as the first external electrode formed on the first side surface of the ceramic body and electrically connected to the first internal electrode.

In order to avoid an overlapped description, a detailed description regarding features of the composite electronic component according to another exemplary embodiment of the present disclosure that are the same as those of the composite electronic component according to the exemplary embodiment of the present disclosure described above will be omitted. Hereinafter, the composite electronic component according to another exemplary embodiment of the present disclosure will be described in more detail with reference to FIGS. 8 through 10.

Figure 8:
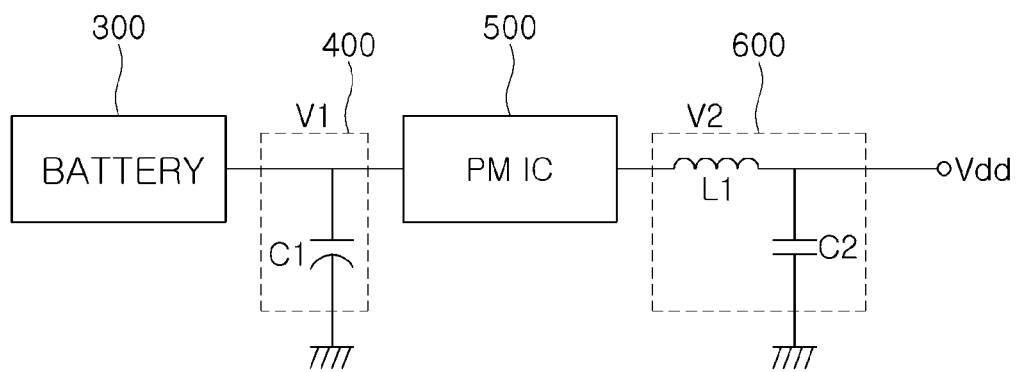
FIG. 8 is a view showing a driving power supplying system supplying driving power to a predetermined terminal requiring the driving power through a battery and a power managing unit.

FIG. 8 is a view showing a driving power supplying system supplying driving power to a predetermined terminal requiring the driving power through a battery and a power managing unit.

Referring to FIG. 8, the driving power supplying system may include a battery 300, a first power stabilizing unit 400, a power managing unit 500, and a second power stabilizing unit 600.

The battery 300 may supply power to the power managing unit 500. Here, the power supplied to the power managing unit 500 by the battery 300 will be defined as first power.

The first power stabilizing unit 400 may stabilize first power $V_1$ and supply the stabilized first power to the power managing unit. By way of example, the first power stabilizing unit 400 may include a capacitor $C_1$ formed between a connection terminal of the battery 300 and the power managing unit 500 and a ground. The capacitor $C_1$ may decrease noise included in the first power.

In addition, the capacitor $C_1$ may be charged with charges. In addition, the capacitor $C_1$ may discharge the charges charged therein in the case in which the power managing unit 500 instantaneously consumes a large amount of current, thereby suppressing a voltage variation of the power managing unit 500.

The capacitor $C_1$ may be a high capacitance capacitor in which 300 or more dielectric layers are stacked.

The power managing unit 500 may convert power input to an electronic apparatus into power appropriate for the electronic apparatus and distribute, charge, and control the power. Therefore, the power managing unit 500 may generally include a DC to DC converter.

In addition, the power managing unit may be implemented as a power management integrated circuit (PMIC).

The power managing unit 500 may convert the first power $V_1$ into second power $V_2$. The second power $V_2$ may be required by an active device such as an integrated circuit (IC), or the like, connected to an output terminal of the power managing unit 500 to receive the driving power from the power managing unit 500.

The second power stabilizing unit 600 may stabilize the second power $V_2$ and supply the stabilized second power to an output terminal $V_{dd}$. The active device such as an integrated circuit (IC), or the like, receiving the driving power from the power managing unit 500 may be connected to the output terminal $V_{dd}$.

By way of example, the second power stabilizing unit 600 may include an inductor $L_1$ connected in series with the power managing unit 500 and the output terminal $V_{dd}$ therebetween. In addition, the second power stabilizing unit 600 may include a capacitor $C_2$ formed between a connection terminal between the power managing unit 500 and the terminal $V_{dd}$ and a ground.

The second power stabilizing unit 600 may decrease noise included in the second power $V_2$.

In addition, the second power stabilizing unit 600 may stably supply the power to the output terminal $V_{dd}$.

The inductor $L_1$ may be a power inductor that may be applied to a large amount of current.

The power inductor may be a high efficiency inductor having an inductance change lower than that of a general inductor when direct current (DC) is applied thereto. That is, it may be considered that the power inductor includes DC bias characteristics (inductance change at the time of applying the DC current thereto) as well as functions of a general inductor.

In addition, the capacitor $C_2$ may be a high capacitance capacitor.

Figure 9:
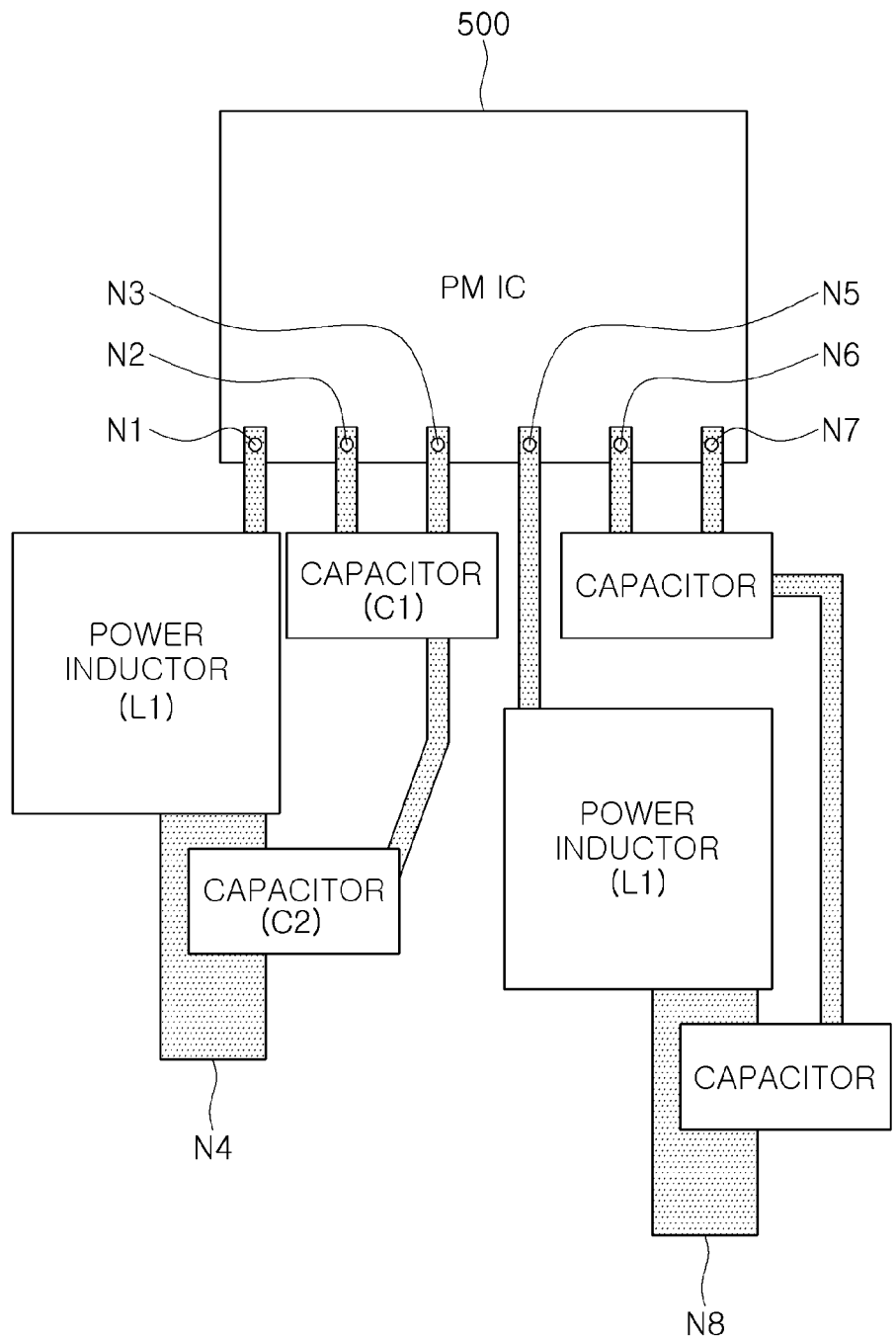
FIG. 9 is a view showing a layout in which the driving power supplying system is disposed.

FIG. 9 is a view showing a layout in which the driving power supplying system is disposed.

Referring to FIG. 9, a layout in which the power managing unit 500, the power inductor $L_1$, and the second capacitor $C_2$ are disposed may be confirmed.

Generally, the power managing unit (PMIC) 500 may include several to several ten DC to DC converters. In addition, in order to implement a function of the DC to DC converter, each of the DC to DC converters may require a power inductor and a high capacitance capacitor.

Referring to FIG. 9, the power managing unit 500 may have predetermined terminals N1, N2, and N3. The power managing unit 500 may receive the power supplied from the battery through the second terminal N2. In addition, the power managing unit 500 may convert the power supplied from the battery and supply the converted power through the first terminal N1. The third terminal N3 may be a ground terminal.

Here, the first capacitor $C_1$ may be formed between the connection terminal of the battery and the power managing unit 500, and the ground and serve as the first power stabilizing unit.

In addition, the inductor $L_1$ and the second capacitor $C_2$ may receive the second power supplied from the first terminal N1 and stabilize the second power to supply the driving power to a fourth terminal N4. Therefore, the inductor $L_1$ and the second capacitor $C_2$ may serve as the second power stabilizing unit.

Since fifth to eighth terminal N5 to N8 shown in FIG. 9 perform the same functions as those of the first to fourth terminals N1 to N4, a detailed description thereof will be omitted.

The important fact in designing the layout of the driving power supplying system is that the power managing unit, the power inductor, and the high capacitance capacitor need to be positioned as closely as possible to one another. In addition, designing a short and thick wiring of a power line may be required.

The reason for this is that when the requirements described above are satisfied, an area required for the disposition of a component may be decreased and the occurrence of noise may be suppressed.

In the case in which the number of output terminals of the power managing unit 500 is small, disposing the power inductor and the high capacitance capacitor to be close to each other may be facilitated. However, in the case in which various output terminals of the power managing unit 500 need to be used, the power inductor and the high capacitance capacitor may not be normally disposed due to an increase in density of the component. In addition, a situation in which the power inductor and the high capacitance capacitor need to be disposed in a non-optimal state depending on a priority of power may occur.

For example, since sizes of the power inductor and the high capacitance capacitor are large, a situation in which lengths of a power line and a signal line are inevitably increased at the time of actually disposing the power inductor and the high capacitance capacitor may occur.

In the case in which the power inductor and the high capacitance capacitor are disposed in a non-optimal state, an interval between the power inductor and the high capacitance capacitor and the length of the power line may be increased, such that noise may occur. The noise may have a negative effect on the driving power supplying system.

Figure 10:
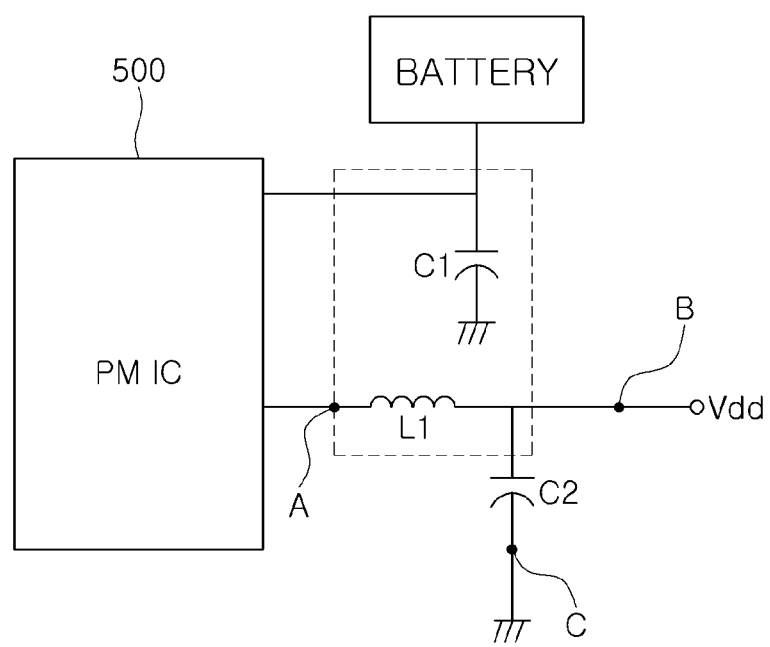
FIG. 10 is a circuit diagram of the composite electronic component according to the exemplary embodiment of the present disclosure.

FIG. 10 is a circuit diagram of the composite electronic component according to the exemplary embodiment of the present disclosure.

Referring to FIG. 10, the composite electronic component 500 may include an input terminal unit A (input terminal), an output terminal unit B (output terminal), aground terminal unit C (ground terminal), a power stabilizing unit.

The power stabilizing unit may include the first capacitor $C_1$ and the power inductor $L_1$.

The composite electronic component 500 may be a device capable of serving as the first and second power stabilizing units described above.

The input terminal unit A may receive power converted by the power managing unit 500.

The power stabilizing unit may stabilize power supplied from the input terminal unit A.

In addition, the power stabilizing unit may stabilize power supplied from a battery by the first capacitor $C_1$ in the composite electronic component.

The output terminal unit B may supply the stabilized power to the output terminal $V_{dd}$.

The ground terminal unit C may connect the power stabilized by the power stabilizing unit to a ground through a separate second capacitor $C_2$.

Meanwhile, the power stabilizing unit may include the first capacitor $C_1$ connected between the battery and the power managing unit 500 and the power inductor $L_1$ connected between the input terminal unit A and the output terminal unit B.

Referring to FIG. 10, the first capacitor $C_1$ and the power inductor $L_1$ may be formed as a single component, such that an interval between the first capacitor $C_1$ and the power inductor $L_1$ may be decreased.

As described above, the composite electronic component 500 may be formed by implementing the power inductor and the high capacitance capacitor provided in a power terminal of the power managing unit 500 and the battery as a single component. Therefore, in the composite electronic component 500, a degree of integration of devices may be improved.

Figure 11:
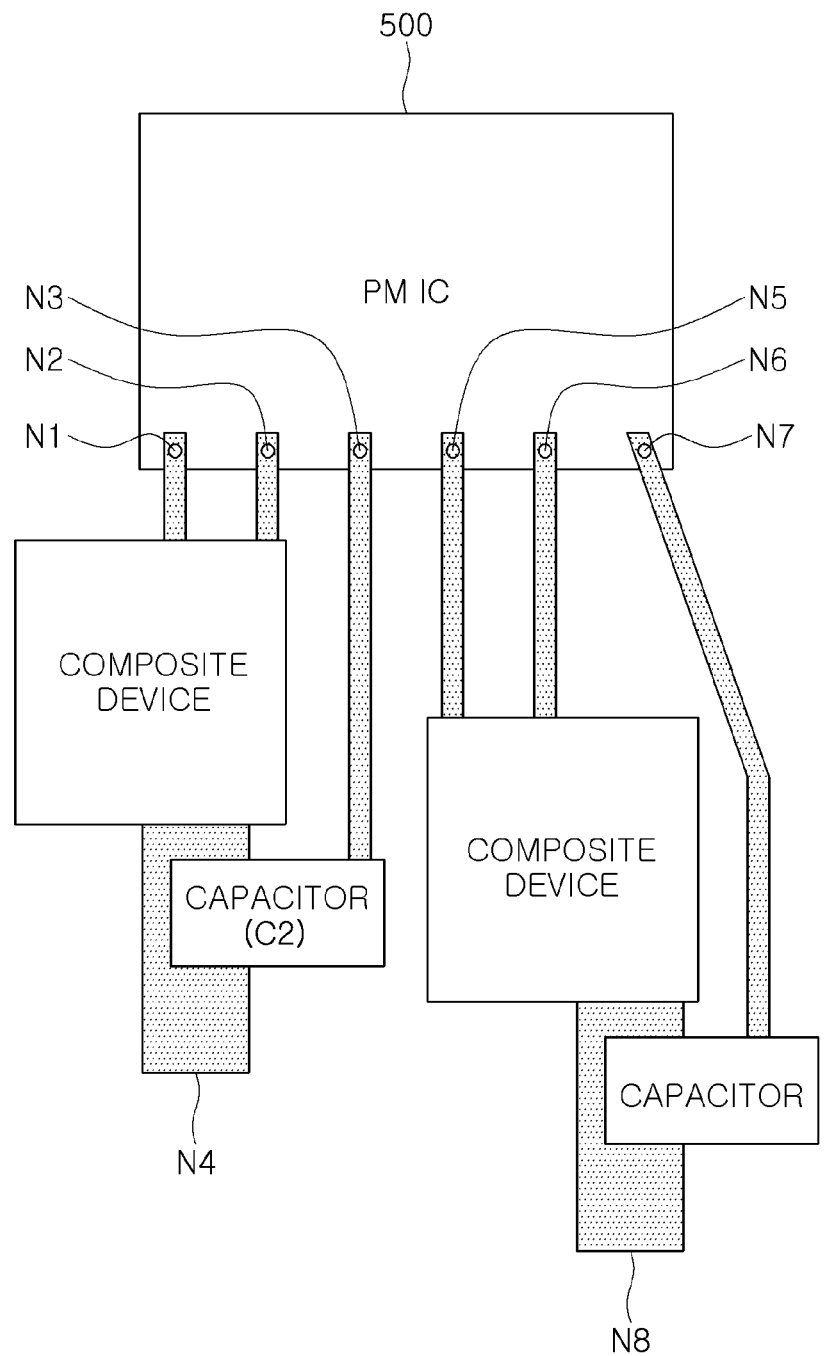
FIG. 11 is a view showing a layout in which the driving power supplying system using the composite electronic component according to the exemplary embodiment of the present disclosure is disposed.

FIG. 11 is a view showing a layout in which the driving power supplying system using the composite electronic component according to the exemplary embodiment of the present disclosure is disposed.

Referring to FIG. 11, it may be confirmed that the first capacitor $C_1$ and the power inductor $L_1$ shown in FIG. 9 are replaced by the composite electronic component according to an exemplary embodiment of the present disclosure.

As described above, the composite electronic component may serve as the first and second power stabilizing units.

In addition, the first capacitor $C_1$ and the power inductor $L_1$ may be replaced by the composite electronic component according to the exemplary embodiment of the present disclosure, whereby a wiring length may be significantly decreased. In addition, the number of disposed devices may be decreased, whereby the elements may be optimally disposed.

That is, according to the exemplary embodiment of the present disclosure, the power managing unit, the power inductor, and the high capacitance capacitor may be positioned as closely as possible to one another, and a short and thick wiring of the power line may be designed to thereby decrease noise.

Meanwhile, electronic apparatus manufacturers have made an effort to decrease a size of a printed circuit board (PCB) included in an electronic apparatus in order to satisfy consumers' demand. Therefore, it has been demanded to increase a degree of integration of an IC mounted on the PCB. As in the composite electronic component according to an exemplary embodiment of the present disclosure, a plurality of devices are implemented as a single composite component, whereby such a demand may be satisfied.

Further, according to an exemplary embodiment of the present disclosure, two components (second capacitor and power inductor) are implemented as a single composite electronic component, whereby an area in which they are mounted on the PCB may be decreased. According to an exemplary embodiment of the present disclosure, an area in which components are mounted may be decreased as compared with an existing disposition layout by about 10 to 30%.

Further, according to an exemplary embodiment of the present disclosure, the power managing unit 500 may supply the driving power to the IC through the shortest wiring.

Board having Composite Electronic Component Mounted Thereon

Figure 12:
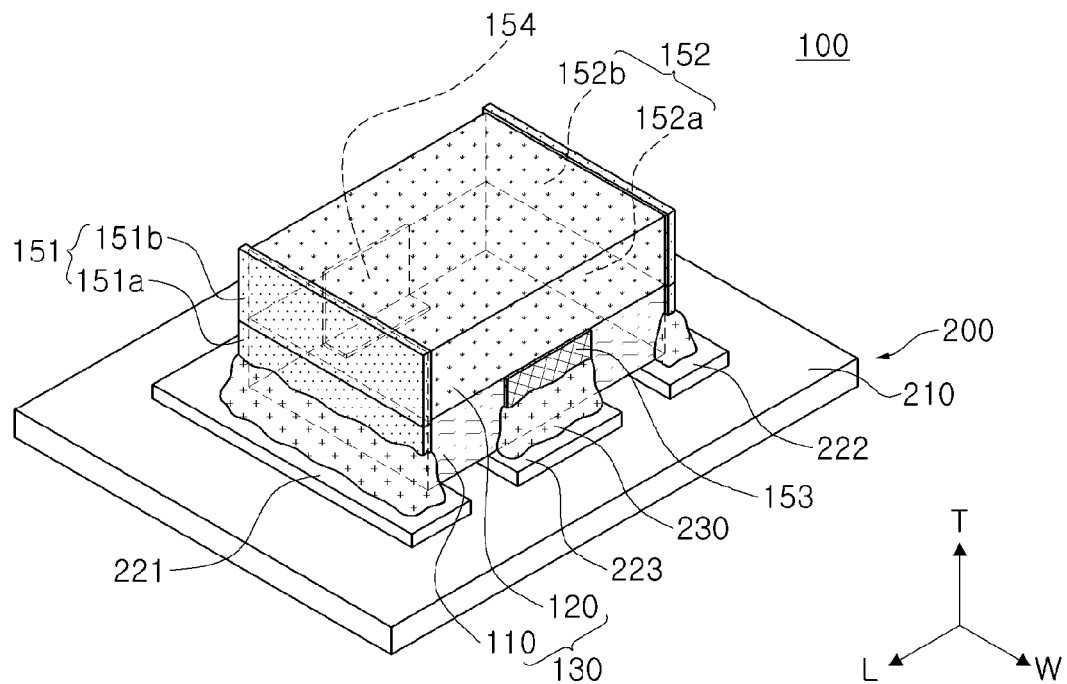
FIG. 12 is a perspective view showing a form in which the composite electronic component of FIG. 1 is mounted on a printed circuit board.

FIG. 12 is a perspective view showing a form in which the composite electronic component of FIG. 1 is mounted on a printed circuit board.

Figure 13:
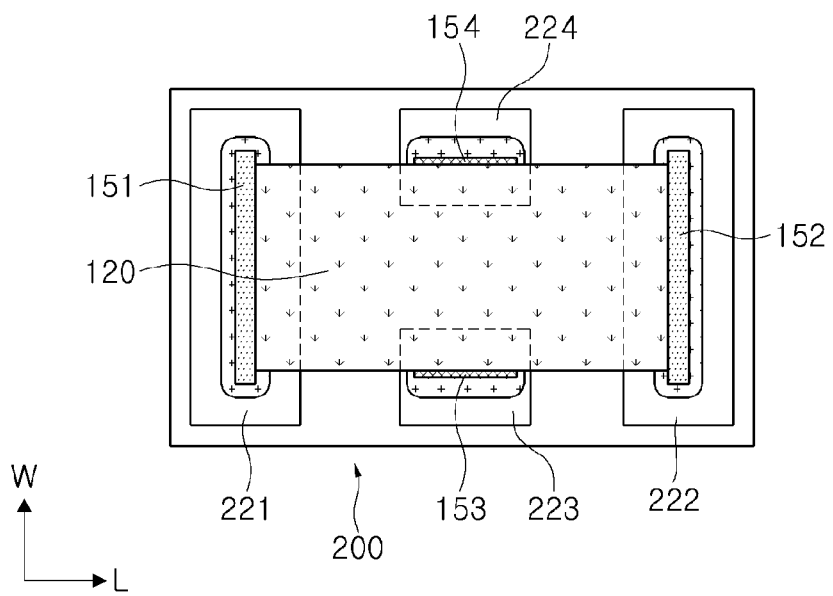
FIG. 13 is a plan view of FIG. 12.

FIG. 13 is a plan view of FIG. 12.

Referring to FIGS. 12 and 13, a board 200 having the composite electronic component 100 mounted thereon according to an exemplary embodiment of the present disclosure mounted thereon may include a printed circuit board 210 on which the composite electronic component 100 is mounted and four electrode pads 221 to 224 formed on an upper surface of the printed circuit board 210.

The electrode pads may be first to fourth electrode pads 221 to 224 connected to the first input terminal 151, the output terminal 152, the ground terminal 153, and the second input terminal 154 of the composite electronic component, respectively.

Here, the first input terminal 151, the output terminal 152, the ground terminal 153, and the second input terminal 154 of the composite electronic component 100 may be electrically connected to the printed circuit board 210 by soldering parts 230, while they are positioned to contact the first to fourth electrode pads 221 to 224, respectively.

As set forth above, according to exemplary embodiments of the present disclosure, a composite electronic component requiring a reduced mounting area in a driving power supplying system, and a board having the same mounted thereon may be provided.

In addition, according to exemplary embodiments of the present disclosure, a composite electronic component capable of suppressing the occurrence of noise in a driving power supplying system, and a board having the same mounted thereon may be provided.

While exemplary embodiments have been shown and described above, it will be apparent to those skilled in the art that modifications and variations could be made without departing from the spirit and scope of the present disclosure as defined by the appended claims.

What is claimed is:

1. A composite electronic component comprising:
  a composite body having a capacitor and an inductor coupled to each other, the capacitor including a ceramic body in which a plurality of dielectric layers and first and second internal electrodes facing each other with the dielectric layers interposed therebetween are stacked, and the inductor including a magnetic body including a coil part;
  a first input terminal formed on a first end surface of the composite body and electrically connected to the coil part of the inductor;
  a second input terminal formed on at least one of upper and lower surfaces and a second side surface of the composite body, electrically connected to the second internal electrode of the capacitor, and electrically isolated from the coil part of the inductor;
  an output terminal formed on a second end surface of the composite body and electrically connected to the coil part of the inductor; and
  a ground terminal formed on at least one of the upper and lower surfaces and a first side surface of the composite body and electrically connected to the first internal electrode of the capacitor.

2. The composite electronic component of claim 1, wherein the magnetic body has a form in which a plurality of magnetic layers having conductive patterns formed thereon are stacked, the conductive patterns configuring the coil part.

3. The composite electronic component of claim 1, wherein the inductor has a thin film form in which the magnetic body includes an insulating substrate and a coil formed on at least one surface of the insulating substrate.

4. The composite electronic component of claim 1, wherein the magnetic body includes a core and a winding coil wound around the core.

5. The composite electronic component of claim 1, wherein the inductor is a power inductor.

6. The composite electronic component of claim 1, wherein the first internal electrode has a lead portion exposed to the first side surface of the composite body, and the second internal electrode has a lead portion exposed to the second side surface of the composite body.

7. The composite electronic component of claim 1, wherein the inductor is disposed on the capacitor.

8. The composite electronic component of claim 1, wherein the capacitor and the inductor are connected to each other by a conductive adhesive.

9. A composite electronic component, comprising:
  a composite body having a capacitor and an inductor coupled to each other, the capacitor including a ceramic body in which a plurality of dielectric layers and first and second internal electrodes facing each other with the dielectric layers interposed therebetween and having lead portions exposed to first and second side surfaces of the ceramic body, respectively, are stacked, and the inductor including a magnetic body including a coil part;
  a first external electrode formed on the first side surface of the ceramic body and electrically connected to the first internal electrode, a second external electrode formed on the second side surface of the ceramic body, electrically connected to the second internal electrode, and electrically isolated from the coil part, and first and second dummy electrodes formed on first and second end surfaces of the ceramic body, respectively; and third and fourth external electrodes formed on first and second end surfaces of the magnetic body, respectively, and electrically connected to the coil part, wherein the composite body includes a first input terminal formed by coupling the first dummy electrode and the third external electrode to each other, a second input terminal formed as the second external electrode, an output terminal formed by coupling the second dummy electrode and the fourth external electrode to each other, and a ground terminal formed as the first external electrode.

10. The composite electronic component of claim 9, wherein the magnetic body has a form in which a plurality of magnetic layers having conductive patterns formed thereon are stacked, the conductive patterns configuring the coil part.

11. The composite electronic component of claim 9, wherein the inductor has a thin film form in which the magnetic body includes an insulating substrate and a coil formed on at least one surface of the insulating substrate.

12. The composite electronic component of claim 9, wherein the magnetic body includes a core and a winding coil wound around the core.

13. The composite electronic component of claim 9, wherein the inductor is a power inductor.

14. The composite electronic component of claim 9, wherein the inductor is disposed on the capacitor.

15. The composite electronic component of claim 9, wherein the capacitor and the inductor are connected to each other by a conductive adhesive.

16. A composite electronic component comprising:
a first input terminal receiving power converted by a power managing unit;
a second input terminal receiving power supplied from a battery;
a power stabilizing unit stabilizing the power converted by the power managing unit and the power supplied from the battery and including a composite body having a capacitor and an inductor coupled to each other, the capacitor including a ceramic body in which a plurality of dielectric layers and first and second internal electrodes facing each other with the dielectric layers interposed therebetween are stacked, and the inductor including a magnetic body including a coil part;
an output terminal supplying the power converted by the power managing unit and stabilized by the power stabilizing unit; and
a ground terminal for grounding.

17. The composite electronic component of claim 16, wherein the first input terminal is formed on a first end surface of the composite body,
the second input terminal is formed on a lower surface and a second side surface of the composite body and is connected to the second internal electrode of the capacitor,
the output terminal is formed on a second end surface of the composite body, and
the ground terminal is formed on the lower surface and a first side surface of the composite body and is connected to the first internal electrode of the capacitor.

18. The composite electronic component of claim 16, wherein the first internal electrode has a lead portion exposed to a first side surface of the composite body, and the second internal electrode has a lead portion exposed to a second side surface of the composite body.

19. The composite electronic component of claim 16, wherein the first input terminal is formed by coupling a first dummy electrode formed on a first end surface of the ceramic body to a third external electrode formed on a first end surface of the magnetic body and connected to the coil part to each other,
the second input terminal is formed as a second external electrode formed on a second side surface of the ceramic body and electrically connected to the second internal electrode,
the output terminal is formed by coupling a second dummy electrode formed on a second end surface of the ceramic body to a fourth external electrode formed on a second end surface of the magnetic body and connected to the coil part to each other, and
the ground terminal is formed as a first external electrode formed on a first side surface of the ceramic body and electrically connected to the first internal electrode.

20. A board having a composite electronic component mounted thereon, the board comprising:
a printed circuit board having three or more electrode pads disposed thereon;
the composite electronic component of claim 1 installed on the printed circuit board; and
soldering parts connecting the electrode pads and the composite electronic component to each other.

21. The board of claim 20, wherein the electrode pads include a first electrode pad connected to the first input terminal of the composite electronic component, a second electrode pad connected to the output terminal of the composite electronic component, a third electrode pad connected to the ground terminal of the composite electronic component, and a fourth electrode pad connected to the second input terminal of the composite electronic component.

22. A board having a composite electronic component mounted thereon, the board comprising:
a printed circuit board having three or more electrode pads disposed thereon;
the composite electronic component of claim 9 installed on the printed circuit board; and
soldering parts connecting the electrode pads and the composite electronic component to each other.

23. The board of claim 22, wherein the electrode pads include a first electrode pad connected to the first input terminal of the composite electronic component, a second electrode pad connected to the output terminal of the composite electronic component, a third electrode pad connected to the ground terminal of the composite electronic component, and a fourth electrode pad connected to the second input terminal of the composite electronic component.

24. A board having a composite electronic component mounted thereon, the board comprising:
a printed circuit board having three or more electrode pads disposed thereon;
the composite electronic component of claim 16 installed on the printed circuit board; and
soldering parts connecting the electrode pads and the composite electronic component to each other.

25. The board of claim 24, wherein the electrode pads include a first electrode pad connected to the first input terminal of the composite electronic component, a second electrode pad connected to the output terminal of the composite electronic component, a third electrode pad connected to the ground terminal of the composite electronic component, and a fourth electrode pad connected to the second input terminal of the composite electronic component.

\* \* \* \* \*